US007380203B2

(12) United States Patent
Keely et al.

(10) Patent No.: US 7,380,203 B2
(45) Date of Patent: May 27, 2008

(54) NATURAL INPUT RECOGNITION TOOL

(75) Inventors: Leroy B. Keely, Portola Valley, CA (US); Adrian J. Garside, Sammamish, WA (US); Ravipal Soin, Bellevue, WA (US); David V. Winkler, Seattle, WA (US); Erik M. Geidl, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 10/146,486

(22) Filed: May 14, 2002

(65) Prior Publication Data

US 2003/0216913 A1 Nov. 20, 2003

(51) Int. Cl.
*G06F 17/00* (2006.01)
*G06F 17/20* (2006.01)
*G06F 15/00* (2006.01)

(52) U.S. Cl. .................. 715/230; 715/263; 715/268; 704/3; 704/9; 704/235; 704/251; 704/257

(58) Field of Classification Search ............... 715/531, 715/530, 230, 263, 268; 704/235, 3, 9, 251, 704/257
See application file for complete search history.

(56) References Cited

U.S. PATENT DOCUMENTS 4,829,576 A * 5/1989 Porter .................. 704/235
4,994,966 A * 2/1991 Hutchins .................. 704/9
5,070,478 A * 12/1991 Abbott .................. 715/531

(Continued)

OTHER PUBLICATIONS

Lai, Jennifer, et al., "MedSpeak: Report Creation With Continuous Speech Recognition", CH197 Electronic Publications, Mar. 22-27, 1997, pp. 1-13 (downloaded from: http://sigchi.org/chi97/proceedings/paper/jcl.htm).*

(Continued)

*Primary Examiner*—Jean B. Fleurantin
*Assistant Examiner*—Robert Stevens
(74) *Attorney, Agent, or Firm*—Birch, Stewart, Kolasch & Birch, LLP

(57) ABSTRACT

A recognition tool according to various examples of the invention intelligently recognizes natural input before it is passed to a destination or target application. More particularly, the recognition tool according to various examples of the invention provides better formatting for text recognized from natural input, based upon the context in which the text is being inserted into a target application. The recognition tool also provides various tools for correcting inaccurately recognized text. The recognition tool may allow a user to select only a part of an inaccurate text, and then identify alternate text candidates based upon the selected portion of the inaccurate text. Further, when the user selects text containing multiple words for correction, the recognition tool provides cross combinations of alternate text candidates for the user's selection. Still further, if the user replaces inaccurate text by submitting a new natural input object, the recognition tool ensures that the text recognized from the new natural input object is different from the inaccurate text been replaced. The recognition tool additionally affects the recognition experience after recognized text has been provided to the target application. The recognition tool provides the target application with the original natural input object for the recognized text, along with the alternate text candidates for that original natural input object. Thus, the target application can use the alternate text candidates to correct inaccurately recognized text. Further, a user can insert the original natural input object for recognized text within the target application.

24 Claims, 7 Drawing Sheets

U.S. PATENT DOCUMENTS

| | | | | |
|---|---|---|---|---|
| 5,434,777 | A * | 7/1995 | Luciw | 704/9 |
| 5,500,920 | A * | 3/1996 | Kupiec | 704/270.1 |
| 5,500,937 | A | 3/1996 | Thompson-Rohrlich | |
| 5,608,624 | A * | 3/1997 | Luciw | 715/210 |
| 5,617,488 | A | 4/1997 | Hong et al. | |
| 5,625,814 | A * | 4/1997 | Luciw | 707/5 |
| 5,652,898 | A * | 7/1997 | Kaji | 704/10 |
| 5,710,831 | A | 1/1998 | Beernink et al. | |
| 5,748,841 | A * | 5/1998 | Morin et al. | 704/257 |
| 5,799,273 | A * | 8/1998 | Mitchell et al. | 704/235 |
| 5,799,279 | A * | 8/1998 | Gould et al. | 704/275 |
| 5,805,775 | A * | 9/1998 | Eberman et al. | 706/11 |
| 5,850,480 | A | 12/1998 | Scanlon | |
| 5,909,666 | A * | 6/1999 | Gould et al. | 704/251 |
| 5,920,836 | A * | 7/1999 | Gould et al. | 704/251 |
| 5,933,531 | A | 8/1999 | Lorie | |
| 5,999,896 | A * | 12/1999 | Richardson et al. | 704/9 |
| 6,005,973 | A | 12/1999 | Seybold et al. | |
| 6,061,646 | A * | 5/2000 | Martino et al. | 704/3 |
| 6,064,959 | A * | 5/2000 | Young et al. | 704/251 |
| 6,081,774 | A * | 6/2000 | de Hita et al. | 704/9 |
| 6,088,671 | A * | 7/2000 | Gould et al. | 704/235 |
| 6,122,613 | A * | 9/2000 | Baker | 704/235 |
| 6,138,098 | A * | 10/2000 | Shieber et al. | 704/257 |
| 6,175,820 | B1 * | 1/2001 | Dietz | 704/235 |
| 6,246,981 | B1 * | 6/2001 | Papineni et al. | 704/235 |
| 6,260,015 | B1 * | 7/2001 | Wang et al. | 704/257 |
| 6,327,566 | B1 * | 12/2001 | Vanbuskirk et al. | 704/257 |
| 6,434,526 | B1 * | 8/2002 | Cilurzo et al. | 704/270.1 |
| 6,434,547 | B1 * | 8/2002 | Mishelevich et al. | 707/3 |
| 6,457,031 | B1 * | 9/2002 | Hanson | 715/531 |
| 6,510,453 | B1 * | 1/2003 | Apfel et al. | 709/206 |
| 6,514,201 | B1 * | 2/2003 | Greenberg | 600/437 |
| 6,684,188 | B1 * | 1/2004 | Mitchell et al. | 705/3 |
| 6,839,669 | B1 * | 1/2005 | Gould et al. | 704/246 |
| 6,904,405 | B2 * | 6/2005 | Suominen | 704/235 |
| 6,986,106 | B2 * | 1/2006 | Soin et al. | 715/532 |
| 2002/0010714 | A1 * | 1/2002 | Hetherington | 707/505 |
| 2002/0072914 | A1 * | 6/2002 | Alshawi et al. | 704/270.1 |
| 2002/0143544 | A1 * | 10/2002 | Gschwendtner | 704/260 |
| 2002/0188452 | A1 * | 12/2002 | Howes | 704/270 |
| 2003/0055655 | A1 * | 3/2003 | Suominen | 704/276 |
| 2003/0130843 | A1 * | 7/2003 | Ky | 704/235 |
| 2003/0212961 | A1 * | 11/2003 | Soin et al. | 715/530 |
| 2004/0205448 | A1 * | 10/2004 | Grefenstette et al. | 715/500 |
| 2004/0205671 | A1 * | 10/2004 | Sukehiro et al. | 715/532 |

OTHER PUBLICATIONS

Heifetz, Laurence J., "Choosing the Right EMR System", Oncology Issues, Sep./Oct. 2001, pp. 18-21.*

"Senior Technician on Voice Recognition, vol. III", Jan. 1997, pp. 1-11 (downloaded from: http://www.pbol.com/voice_recognition/voice_article.htm).*

IBM ViaVoice for Windows Personal Edition, User's Guide Release 8, International Business Machines Corp., Aug. 2000, pp. 19-25, 39-49 and 51-69.*

Deitel, H. M., et al., Java: How to Program, 2nd Edition, Prentice Hall, Upper Saddle River, NJ, © 1998, pp. 74, 419-420, 423, 438-439 and 993.*

Rubin, Charles, Running Microsoft Word 2000, Microsoft Press, Redmond, WA, © 1999, pp. 4-5, 60-70, 82, 187 and 190-207.*

Suhm, Bernhard, et al., "Multimodal Error Correction for Speech User Interfaces", ACM Transactions on Computer-Human Interaction, vol. 8, No. 1, Mar. 2001, pp. 60-98.*

Masui, Toshiyuki, "An Efficient Text Input Method for Pen-Based Computers", CHI 98, Los Angeles, CA, Apr. 18-23, 1998, pp. 328-335.*

Schwartz, R., et al., "Context-Dependent Modeling For Acoustic-Phonetic Recognition of Continuus Speech", IEEE Doc. # CH2118-8/85/0000-1205, © 1985, pp. 1205-1208.*

Vo, Minh Tue, et al., "Building An Application Framework For Speech and Pen Input Integraion in Multimodal Learning Interfaces", IEEE Doc. # 0-7803-3192-3/96, © 1996, pp. 3545-3548.*

Camarda, Bill, Special Edition Using Microsoft Word '97, Que Corp., Indianapolis, IN, © 1997, pp. 54-55 and 199-200.*

Hürst, Wolfgang, et al., "Error repair in Human Handwriting—An Intelligent User Interface for Automatic On-Line Handwriting Recognition", IEEE Doc. # 0-8186-8548-4/98, © 1998, pp. 389-396.*

Schomaker, L., "From Handwriting Analysis to Pen-Computer Applications", Electronics & Communication Engineering Journal, Jun. 1998, pp. 93-102.*

Poupyrev, Ivan, et al., "Virtual Notepad: Handwriting in Immersive VR", IEEE Doc. # 0-8186-8362-7/98, © 1998, pp. 126-132.*

Bott, Ed, et al., Special Edition Using Microsoft Office XP, Que Corp., Indianapolis, IN, May 2001, pp. 46-49, 90-99, 370-378, 380-383 and 392-396.*

Moseley, Lonnie E., et al., Mastering Microsoft Office 97, Professional Edition (2nd Edition), Sybex Inc., Alameda, CA, # 1997, pp. 96-97 and 152-161.*

Zick, Robert G., et al., "Voice Recognition Software Versus a Traditional Transcription Service for Physician Charting in the ED", The American Journal of Emergency Medicine, vol. 19, Issue 4, Jul. 2001, pp. 295-298.*

Kim, Gyeonghwan, et al., "An Architecture for Handwritten Text Recognition Systems", IJDAR 1999, vol. 2, No. 1, Jul. 1999, pp. 37-44.*

Mankoff, Jennifer, et al., "Interaction Techniques for Ambiguity Resolution in Recognition-Based Interfaces", UIST '00, San Diego, CA, Nov. 6-8, 2000, pp. 11-20.*

* cited by examiner

NATURAL INPUT RECOGNITION TOOL

FIELD OF THE INVENTION

The present invention relates to a recognition tool for improving a user's experience in recognizing text from natural input, such as speech or handwriting input. More particularly, the present invention relates to a recognition tool that improves the user's recognition experience both before and after text recognized from a natural input object is inserted into a target application.

BACKGROUND OF THE INVENTION

As computers become more and more integrated into our modern society, there is a growing need for tools that will allow a user to efficiently enter data into a computer. Some of the most desired input tools are those that allow a user to enter data using natural input techniques rather than typing on a physical or software QWERTY keyboard. These natural input techniques, which include handwriting and speech, offer users the promise of a familiar and convenient method of creating data that requires no special skills. To this end, great strides have been made in developing applications that recognize text from such natural input. For example, some voice recognition applications will accurately transcribe text from a user's speech. Similarly, some handwriting recognition applications will recognize text from both block print and cursive handwriting.

One important advantage of these natural input techniques is that they potentially offer users a much higher throughput than entering data through a keyboard. The typical user can speak considerably faster than he or she can type. Thus, a user can quickly input text by speaking that would otherwise take much longer to input by typing on a keyboard. Likewise, if a user has not memorized the position of keys on a QWERTY keyboard, that user may be able to handwrite words with a stylus and a digitizer faster than he or she can type those words on a keyboard.

While natural input offers the potential for high throughput in theory, in actuality the inherent inaccuracies of natural input can significantly reduce that potential. For example, the voice recognition application may be unable to distinguish the spoken word "they're" from "there." A handwriting recognition application may similarly be unable to distinguish the handwritten word "clog" from the handwritten word "dog." Currently, natural input recognition engines provide recognition candidates based only upon the natural input object to be recognized. The destination or intended use of the recognized text has no influence over how a recognition engine selects a recognition candidate to recognize a natural input object.

In addition to the difficulties in accurately recognizing text from a natural input object, there are additional difficulties in correctly formatting the recognized text. For example, it is difficult for a natural input recognition engine to determine if recognized words should have spacing between them, and, if so how many spaces. Other than pauses, speech input provides no information as to spacing. While handwriting has some mechanisms for indicating spacing, such as proofing marks and leaving space between handwritten words, these cues are cumbersome for the user to employ or difficult for a recognition engine to accurately interpret. Similarly, it may be difficult for a natural input recognition engine to determine which characters in recognized text should be capitalized, if any. Still further, it may be difficult for a natural input recognition engine to properly recognize punctuation from a natural input object.

In an attempt to address this problem, some recognition engines include an automatic spacing feature that automatically provides spacing for recognized text. The solution has not worked very well, however. For example, if an automatic spacing process always inserts a space after recognized text, then when the user inserts a correction into an existing word, the automatic spacing process will create an unwanted space in the middle of the resulting word. On the other hand, when the user adds a word at a location where a space already exists, the automatic spacing process will create an extra, unwanted space.

SUMMARY OF THE INVENTION

To address these problems, the recognition tool according to the invention intelligently recognizes natural input before it is passed to a destination or target application. More particularly, the recognition tool according to the invention provides better formatting for text recognized from natural input, based upon the context in which the text is being inserted into a target application. In addition, the recognition tool creates a model object that includes the alternate text candidates identified for each natural input object in a document. When a natural input recognition engine is indifferent to selecting between multiple alternate text candidates to recognize a natural input object, the recognition engine can create a lattice of the different text candidates according to, for example, a natural language model. If a user then definitively selects a text candidate corresponding to one natural input object, the lattice can be used to correctly select text candidates for other natural input objects.

The recognition tool according to the invention also provides various tools for correcting inaccurately recognized text. For example, the recognition tool allows a user to select only a part of an inaccurate text, and then identifies alternate text candidates based upon the selected portion of the inaccurate text. Further, when the user selects text containing multiple words for correction, the recognition tool provides cross combinations of alternate text candidates for the user's selection. Still further, if the user replaces inaccurate text by submitting a new natural input object, the recognition tool ensures that the text recognized from the new natural input object is different from the inaccurate text being replaced.

In addition to improving the user's recognition experience before text is sent to the destination or target software application, the recognition tool of the invention also improves the user's recognition experience after recognized text has been sent to the target application. The recognition tool provides the target application with the original natural input object for the recognized text, along with the alternate text candidates identified for that original natural input object. Thus, the target application can use the alternate text candidates to correct inaccurately recognized text. Further, a user can insert the original natural input object from which text was recognized into the target application.

BRIEF DESCRIPTION OF THE DRAWINGS

The foregoing summary of the invention, as well as the following detailed description of preferred embodiments, will be better understood when read in conjunction with the accompanying drawings.

DETAILED DESCRIPTION OF PREFERRED EMBODIMENTS

Overview

The present invention relates to a recognition tool for more accurately recognizing and formatting text from natural input. A recognition tool according to the invention may be implemented with instructions that can be executed on a computing device. Accordingly, an exemplary computing environment for executing such instructions will be described. The components and functions of a recognition tool according to the invention will be described in detail as well, along with a correction interface that maybe employed by the recognition tool according to the invention.

Exemplary Operating Environment

As previously noted, the text recognition tool of the invention may be implemented using software. That is, the recognition tool may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
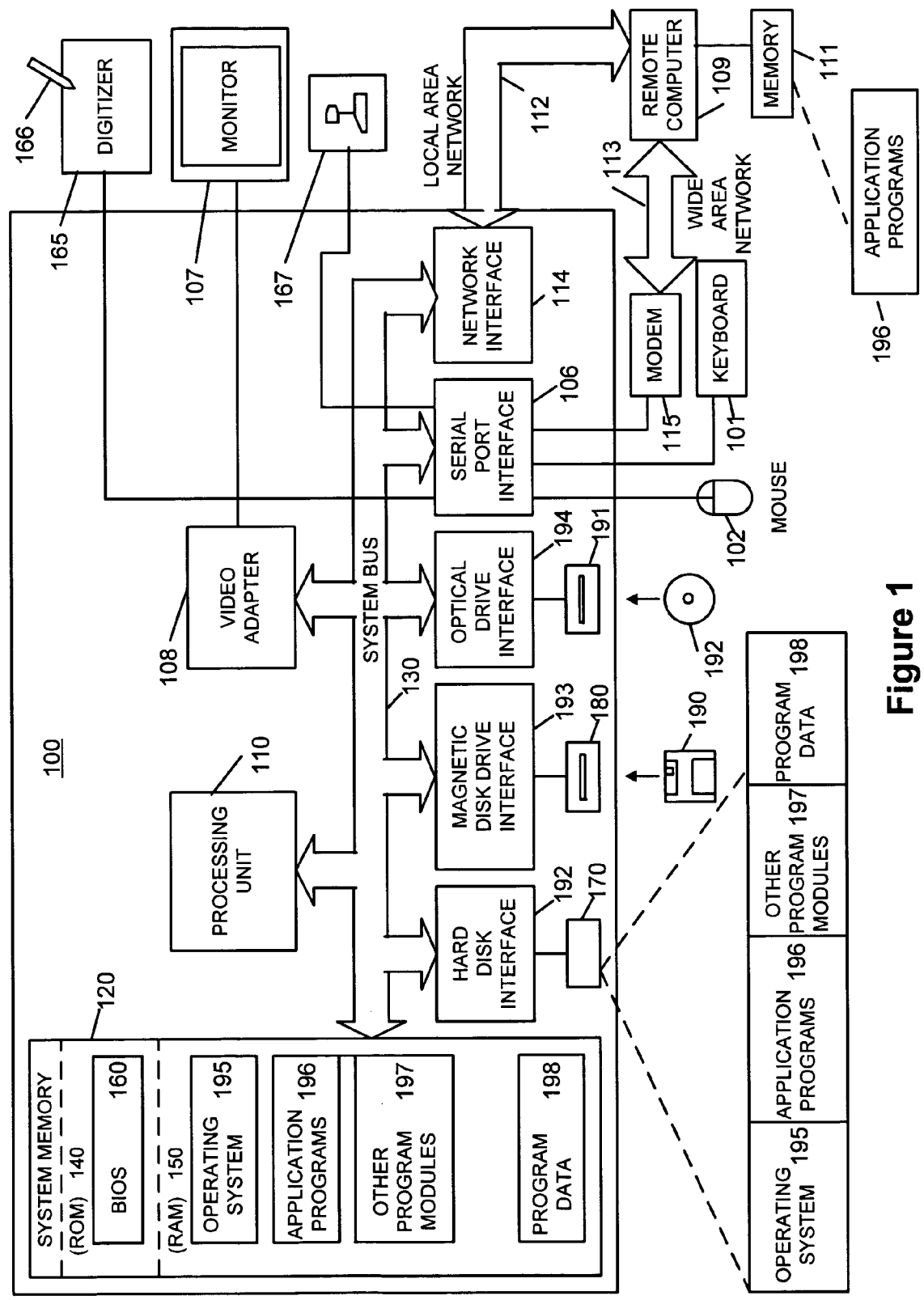
FIG. 1 shows a schematic diagram of a general-purpose digital computing environment that can be used to implement various aspects of the invention.

Because the invention may be implemented using software, it may be helpful for a better understanding of the invention to briefly discuss the components and operation of a typical programmable computer on which various embodiments of the invention may be employed. Such an exemplary computer system is illustrated in FIG. 1. The system includes a general-purpose computer 100. This computer 100 may take the form of a conventional personal digital assistant, a tablet, desktop or laptop personal computer, network server or the like.

Computer 100 typically includes at least some form of computer readable media. Computer readable media can be any available media that can be accessed by the computer 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 100 typically includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. A basic input/output system 160 (BIOS), containing the basic routines that help to transfer information between elements within the computer 100, such as during start-up, is stored in the ROM 140.

The computer 100 may further include additional computer storage media devices, such as a hard disk drive 170 for reading from and writing to a hard disk, a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100.

Although the exemplary environment described herein employs a hard disk drive 170, a removable magnetic disk drive 180 and a removable optical disk drive 191, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Also, it should be appreciated that more portable embodiments of the computer 100, such as a tablet personal computer or personal digital assistant, may omit one or more of the computer storage media devices discussed above.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through various input devices, such as a keyboard 101 and a pointing device 102 (for example, a mouse, touchpad, or pointing stick). As previously noted, the invention is directed to a correction tool that is very useful for correcting text inaccurately recognized from a natural input technique. Accordingly, the computing device 120 will typically also include input devices for accepting natural input. For example, the computer 100 may include a digitizer 165 and a stylus 166, with a user may employ to create handwriting data. The computer 100 may also include a microphone 167, through which a user can input speech information for recognition by a voice recognition process. The computer 100 may also have additional input devices, such as a joystick, game pad, satellite dish, scanner, touch screen, or the like.

These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As will be appreciated by those of ordinary skill in the art, the monitor 107 may incorporate the digitizer 165. This arrangement conveniently allows a user to employ the stylus 166 to point directly to objects displayed on the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, and thus will not be explained in detail here.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, may be connected to the system bus 130 via the serial port interface 106. In a networked environment, program modules depicted relative to the personal computer 100, or portions thereof, may be stored in a remote memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

The Recognition Tool

Figure 2:
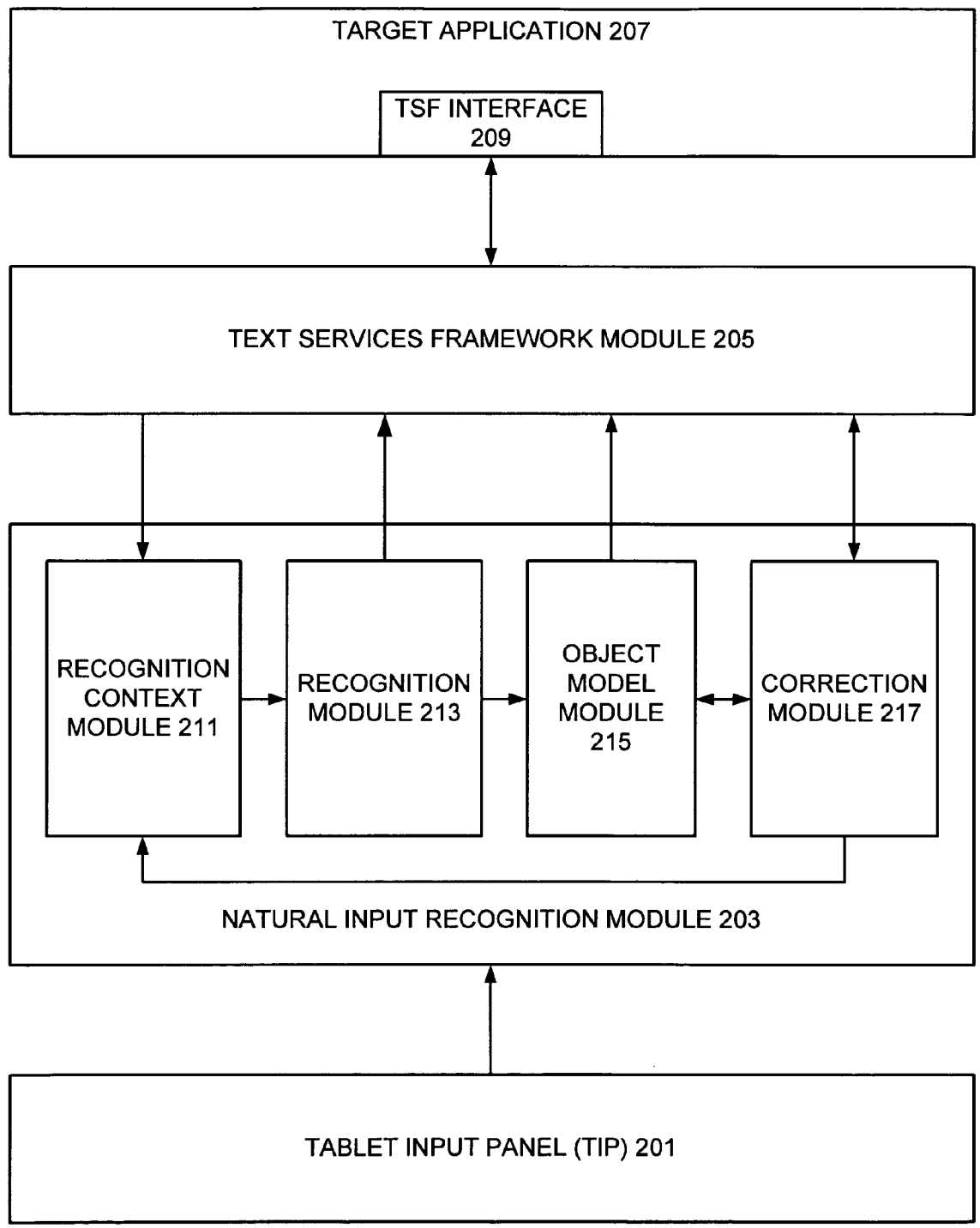
FIG. 2 illustrates components of a recognition tool according to an embodiment of the invention.

Turning now to FIG. 2, this figure illustrates the components of a recognition tool according to one embodiment of the invention, together with the components of the environment in which it operates. More particularly, this figure illustrates a tablet input panel 201, the natural input recognition module 203 according to the invention, a text services framework module 205 and a target application 207. In order to provide a better understanding of the invention, the environment in which the recognition tool of the invention (that is, the natural input recognition module 203) operates will first be described. The components and operation of the natural input recognition module 203 will then be discussed.

As will be appreciated by those of ordinary skill in the art, the tablet input panel 201 is a tool that allows a user to submit one or more types of natural input for recognition and delivery to the target application 207. For example, the tablet input panel 201 may provide a user interface for receiving handwriting input, both for recognizing script and for recognizing individual characters. Alternately, or additionally, the tablet input panel 201 may provide a user interface for initiating and stopping a voice recognition process. It may also provide still other techniques for submitting input data, such as displaying a soft keyboard. Further, the tablet input panel 201 may provide a display, sometimes referred to as a "stage," for previewing text that has been recognized from natural input before the text is inserted into the target application 207. In the illustrated embodiment, the tablet input panel 201 provides user interfaces for receiving both speech and handwriting input.

Turning now to the text services framework module 205, this module may be implemented using the text services framework tool currently provided by Microsoft Corporation in the Microsoft Windows® XP operating system. As known to those of ordinary skill in the art, this text services framework tool serves as a generic input device for inputting text into a compatible target application from a variety of text sources, including the tablet input panel 201. In addition, when the target application supports all of the functions offered by the text services framework tool, the text services framework tool can obtain context information from the target application. More particularly, the text services framework tool can ascertain a variety of types of context information regarding the location in the target application 207 at which it will insert text.

This context information may include, for example, the text, if any, that already exists on either side of the insertion location. Further, it may include the length of the insertion location (the insertion location may be a single insertion point, for example, or a selection of existing text). It may also include any existing text that will be replaced by the insertion of new text at the insertion location. One particularly useful type of context information that may be obtained by the text services framework tool is the type of field in which the insertion location is positioned. More particularly, the field type for a field, conventionally referred to as a "factoid," describes the type of data that should be inserted into that field. For example, the address field for a browser application will typically have the field type or factoid "WEB," because the only data that should be inserted into the address field will take the form of "http://www.microsoft.com."

Similarly, a field in a web site prompting a user for his or her e-mail address will have the field type or factoid "EMAIL," because the only data that should be inserted into this field will take the form of "someone@example.com." It should be noted that, in both of these examples, the field type inherently indicates that no spaces should occur in the text inserted into these fields. A complete listing of field types and combinations of field types currently supported by the text services framework tool in the Microsoft Windows® XP operating system are listed below in Table 1 and Table 2, respectively.

TABLE 1

| Factoids | Definition/Examples |
| --- | --- |
| NONE | Disables all other factoids |
| SYSDICT | Enables the system dictionary only |
| WORDLIST | Enables the word list only |
| EMAIL | someone@example.com |
| WEB | http://www.microsoft.com |
| ONECHAR | All isolated ANSI char supported |
| NUMBER | All num classes |
| DIGIT | 0-9 |
| CURRENCY | $45, 60, £50, ¥30.33 |
| POSTAL CODE | Postal codes, 98112 |
| PERCENT | 87% |
| DATE | 10/30/2001, '01, 31/12, 12/99, 1999-2000 |
| TIME | 12:23:00 PM, 12:30, 24:30, 12:23:01, 1:12 A.M. |
| TELEPHONE | 123 555 0190, 0-123-206 555 0190, (206)555-0190 |
| FILENAME | mydocument.doc, c:\myfolder\file.c |
| UPPERCHAR | Single upper case alphabetical characters; A-Z |
| JPN_COMMON | Commonly used Kanji, Katakana, and Hiragana characters |
| CHS_COMMON | Commonly used Kanji, Katakana, and Hiragana characters |
| CHT_COMMON | Common Kanji, Katakana, and Hiragana characters |
| KOR_COMMON | Commonly used Kanji, Katakana, and Hiragana characters |
| HIRAGANA | Hiragana characters only |
| KATAKANA | Katakana characters only |
| KANJI_COMMON | Commonly used Kanji characters |
| BOPOMOFO | Bopomofo characters |
| JAMO | Hangul compatibility Jamo characters based |
| HANGUL_COMMON | Commonly used Hangul characters |

TABLE 2

| Factoid Combination | Definition |
| --- | --- |
| WEB \| WORDLIST | Web factoid or the word list |
| EMAIL \| WORDLIST | E-mail factoid or the word list |
| FILENAME \| WEB \| WORDLIST | File name factoid or Web factoid and the word list |

Of course, those of ordinary skill in the art will appreciate that the each field type definition listed above may be expanded or narrowed, as desired. It should also be appreciated that various embodiments of the invention may employ additional or alternate field types than those listed above, and that the number of field types that can be identified by the text services framework module 205 can vary from the list above. Further, any other suitable tool than the text services framework tool provided in the Microsoft Windows® XP operating system can be employed as the text services framework module 205. For example, a tool could be employed that only obtains context information from the target application 207, and does not provide a variety of features for inserting text from multiple sources in to the target application 207.

With regard to the target application 207, it may be any application that supports the text services framework module 205 by providing context information to the text services framework module 205. For example, the target application 207 may be the Microsoft Word XP word-processing software product. In this example, the text recognized from natural input objects submitted to the tablet input panel 201 is inserted through the text services framework module 205 into a document being edited by the Microsoft Word XP word processing software product.

To support the text services framework module 205, the target application 207 will include a text services framework interface 209. This interface 209 collects and provides the context information to the text services framework module 205. As previously noted, for example, the text services framework interface 209 can identify the text adjacent to an insertion location. It can also identify the length of the insertion location, the text, if any that will be replaced by text inserted at the insertion location, and the type of field in which the insertion location is positioned. Also, as will be discussed in detail below, the text services framework interface 209 can store a variety of text information provided by the text services framework module 205.

Turning now to the natural input recognition module 203, the natural input recognition module includes a recognition context module 211, a recognition module 213, an object model module 215, and a correction module 217. Each of these modules 211-217 will now be discussed in turn.

The recognition context module 211 provides context information to the recognition module 213 regarding the insertion of text recognized by the recognition module 213 from natural input. This context information allows the recognition module 213 to intelligently recognize text from natural input based upon the destination of the recognized text. For example, the recognition context module 211 receives the context information identified through the text services framework module 205. From this context information, the recognition context module 211 categorizes the field in which the insertion location is positioned. In the illustrated example, the recognition context module 211 will categorize a field in the target application 207 into one of three different categories.

The first category of fields are "controlled" fields that fully support the text services framework module 205. Thus, a field in this category will provide the text services framework module 205 with all applicable context information. Further, the text services framework module 205 can control the content of the field, so that the text services framework module 205 can intelligently insert text into the field. As will be discussed below, by controlling the content of this category of field, the text services framework module 205 can be used to implement automatic spacing heuristics that delete existing spaces from a controlled field, in addition to adding space.

The next category of field is the "smart" field. This field provides context information to the recognition context module 211, but does not offer control to the text services framework module 205. Instead, the text services framework module 205 inserts text to this type of field simply by sending key data. A smart field may provide context information to the recognition context module 211 through the text services framework module 205, as described above. Alternately, the target application 207 may implement a smart field may using an edit control, rich edit control, or other data structure that will allow the recognition context module 211 to directly obtain the field's context information from the target application. The third category of field is the "dumb" field, which provides no context information to the recognition context module 211. An example if this category of field is a custom drawn, non-windowed control, such as an edit box drawn in a Web page.

Using these field categories, the recognition context module 211 may generate formatting heuristics. For example, the recognition context module 211 may create spacing heuristics based upon the text surrounding the insertion location. For example, with a "controlled" field, the recognition context module 211 may implement the following automatic spacing rules for text being sent to the target application 207:

A. Insert a space before a send that starts with a word or a punctuation $, #, (, [, {, but only if:
  There's not already a non-printing character before the insertion location AND
  This text being sent is NOT one of the following, which should concatenate to what precedes them:
    1. The text is being sent to an insertion location that is a selection of existing text, OR
    2. Text being sent to an insertion location positioned after a designated as one to 'never insert space after': @, $, #, (, [, {, ~, _, /, \, and -; OR
    3. The text is being sent to an insertion location that is within a complete or partial web or file or email address (such as when two or more existing contiguous printing characters in the field start with http, ftp://, //, \\, www, or c: (or any single letter followed by a colon) or including the character @) OR
    4. The text is being sent to an insertion location positioned after a character that is a number and the first character in the text being sent is a number OR
    5. The first word in the text being sent has been designated to "remove space before' (such as domain names preceded by a period (.com) and :// OR
    6. The first word in the text being sent, when combined with a word positioned before the insertion location, creates a word other than a "snicker word," such as "penis," except when the first word in the text being sent is 'a' so as not to concatenate the 'a' and word positioned before the insertion location into a compound word.
    7. No space is inserted between a period and a lower case character.

B. Remove existing single-line space characters (such as 'hard-tab,' 'space,' and 'non-breaking space') positioned before the insertion location for sent text having a first word that is in the list in A5 above, or a first character that is !, ?, @, ), ], }, ., :, ;, or -.

C. Insert a space after sent text that ends with a word or a phrase-ending punctuation, such as ), ], }, :, ;, ", but only if:
  There's not already a space after the insertion location AND
  The text being sent is NOT one of the following, which should concatenate to what follows them:
    1. The text is being sent to an insertion location that is a selection of existing text, OR
    2. The ending word in the sent text ends with a character designated as 'never insert space after' (which may be the same list as in A2 above) OR
    3. The ending word in the sent text is a web or file or email address (which may be identified using the same list as in A3 above) OR
    4. The last word being sent when combined with the next word creates a word other than a "snicker word," such as "penis".
    5. No space is inserted between a sentence ending punctuation and a lower case character.

D. Insert one space after a multi-character insertion whose last character is . or ! or ? (for example, don't add any spaces after a lone period).

E. Include spaces between words in the sent text, as indicated by an English default language model, but NOT after a word that includes @ or begins with http://, https://, ftp://, //, \\, www, or c: (or any other letter followed by a colon).

F. Include the following prefixes in the natural input text recognition dictionary (that is, the dictionary employed to recognize text from natural input objects): //, \\, and ://.

G. Include the following suffixes in the natural input text recognition dictionary: ing, 's, er, n't, and typically registered file extensions both alone and preceded by a period (for example, both exe and .exe), and Internet domains both alone and preceded by a period (for example, com and .com).

H. Include common abbreviations in the natural input text recognition dictionary, such as e.g., i.e., a.k.a., and etc.

For smart fields, a similar set of spacing heuristics may be employed. Because these fields do not provide control to the text services framework module 205, however, these heuristics will typically not delete existing spaces, to avoid an inadvertent deletion of space from the wrong location (set forth in step B, above). Thus, the recognition context module 211 can implement the following automatic spacing characteristics for smart fields:

A. Insert a space before a send that starts with a word or a punctuation $, #, (, [, {, but only if:
  There's not already a non-printing character before the insertion location AND
  This text being sent is NOT one of the following, which should concatenate to what precedes them:
    1. The text is being sent to an insertion location that is a selection of existing text, OR
    2. Text being sent to an insertion location positioned after a character designated as one to 'never insert space after': @, $, #, (, [, {, ~, _, /, \, and -; OR
    3. The text is being sent to an insertion location that is within a complete or partial web or file or email address (such as when two or more existing contiguous printing characters in the field start with http, ftp://, //, \\, www, or c: (or any single letter followed by a colon) or including the character @) OR
    4. The text is being sent to an insertion location positioned after a character that is a number and the first character in the text being sent is a number OR
    5. The first word in the text being sent has been designated to 'remove space before' (such as domain names preceded by a period (.com) and :// OR
    6. The first word in the text being sent, when combined with a word positioned before the insertion location, creates a word other than a "snicker word," such as "penis," except when the first word in the text being sent is 'a' so as not to concatenate the 'a' and word positioned before the insertion location into a compound word.
    7. No space is inserted between a period and a lower case character.

B. Insert a space after sent text that ends with a word or a phrase-ending punctuation, such as ), ], }, :, ;, ", but only if:
  There's not already a space after the insertion location AND
  The text being sent is NOT one of the following, which should concatenate to what follows them:
    1. The text is being sent to an insertion location that is a selection of existing text, OR 2. The ending word in the sent text ends with a character designated as 'never insert space after' (which may be the same list as in A2 above) OR
3. The ending word in the sent text is a web or file or email address (which may be identified using the same list as in A3 above) OR
4. The last word being sent when combined with the next word creates a word other than a "snicker word," such as "penis".
5. No space is inserted between a sentence ending punctuation and a lower case character.

C. Insert one space after a multi-character insertion whose last character is . or ! or ? (for example, don't add any spaces after a lone period).

D. Include spaces between words in the sent text, as indicated by an English default language model, but NOT after a word that includes @ or begins with http://, https://, ftp://, //, \\, www, or c: (or any other letter followed by a colon).

E. Include the following prefixes in the natural input text recognition dictionary: //, \\, and ://.

F. Include the following suffixes in the natural input text recognition dictionary: ing, 's, er, n't, and typically registered file extensions both alone and preceded by a period (for example, both exe and .exe), and Internet domains both alone and preceded by a period (for example, corn and .com).

G. Include common abbreviations in the natural input text recognition dictionary, such as e.g., i.e., a.k.a., and etc.

Simpler automatic spacing heuristics can be employed for "dumb" fields. Because these fields do not provide context information identifying the text (if any) around the insertion location, and each erroneously created space presents a burden for the user to correct, space typically is only inserted after sent text. Thus, the context recognition module 211 can implement the following automatic spacing heuristics for such "dumb" fields:

A. Insert a space after sent text that ends with a word or a phrase-ending punctuation, such as ), ], }, :, ;, ", but only if:
  There's not already a space after the insertion location AND
  The text being sent is NOT one of the following, which should concatenate to what follows them:
  1. The text is being sent to an insertion location that is a selection of existing text, OR
  2. The ending word in the sent text ends with a character designated as 'never insert space after': @, $, #, (, [, {, ~, _, /, \, and -, OR
  3. The ending word in the sent text is a web or file or email address (such as when two or more existing contiguous printing characters in the field start with http, ftp://, //, \\, www, or c: (or any single letter followed by a colon) or including the character @).

B. Insert one space after a multi-character insertion whose last character is . or ! or ? (for example, don't add any spaces after a lone period).

C. Include spaces between words in the sent text, as indicated by an English default language model, but NOT after a word that includes @ or begins with http://, https://, ftp://, //, \\, www, or c: (or any other letter followed by a colon).

D. Include the following prefixes in the natural input text recognition dictionary: //, \\, and ://.

E. Include the following suffixes in the natural input text recognition dictionary: ing, 's, er, n't, and typically registered file extensions both alone and preceded by a period (for example, both exe and exe), and Internet domains both alone and preceded by a period (for example, corn and .com).

F. Include common abbreviations in the natural input text recognition dictionary, such as e.g., i.e., a.k.a., and etc.

Of course, the context information can be used to override or modify the automatic spacing heuristics designated for a "controlled" field or "smart" field. For example, if the context recognition module 211 determines that a field is for a password, it can prevent the automatic spacing heuristics from being applied to that field.

Also, while the above-described automatic spacing rules may be implemented for English-language based natural input recognition, other rules may be applied for different languages as appropriate. For example, with French-language based natural input recognition, the recognition context module 211 may implement the following automatic spacing rules for text being sent to a controlled field in the target application 207:

A. Insert a space before a send that starts with a word or a punctuation !, ?, :, ;, $, #, (, [, {, but only if:
  There's not already a non-printing character before the insertion location AND
  This text being sent is NOT one of the following, which should concatenate to what precedes them:
  1. The text is being sent to an insertion location that is a selection of existing text, OR
  2. Text being sent to an insertion location positioned after a character designated as one to 'never insert space after': @, $, #, (, [, {, ~, _, /, \, and -; OR
  3. The text is being sent to an insertion location that is within a complete or partial web or file or email address (such as when two or more existing contiguous printing characters in the field start with http, ftp://, //, \\, www, or c: (or any single letter followed by a colon) or including the character @) OR
  4. The text is being sent to an insertion location positioned after a character that is a number and the first character in the text being sent is a number OR
  5. The first word in the text being sent has been designated to "remove space before' (such as domain names preceded by a period (.com) and :// OR
  6. The first word in the text being sent, when combined with a word positioned before the insertion location, creates a word other than a "snicker word," such as "penis," except when the first word in the text being sent is 'a' so as not to concatenate the 'a' and word positioned before the insertion location into a compound word.
  7. No space is inserted between a period and a lower case character.

B. Remove existing single-line space characters (such as 'hard-tab,' 'space,' and 'non-breaking space') positioned before the insertion location for sent text having a first word that is in the list in A5 above, or a first character that is @, ), ], }, ., :, ;, ", or -.

In addition to spacing format, the context information also can be used to determine capitalization of characters in recognized text. For example, if the recognition context module 211 determines that the insertion location is within a field of the type "E-MAIL," the recognition context module 211 may generate heuristics allowing the recognition module 213 to allow the capitalization of any character in the recognized text. Ordinarily, the recognition module might allow only the first letter in a word to be capitalized. If the recognition context module 211 employs the context information to realize that the recognized text is an e-mail address, however, it can then allow the recognition module 213 to capitalize any character in the recognized text. In other situations, the recognition context module 211 may instruct the recognition module 213 not to capitalize any character in a recognized word other than the first character. Alternately, the recognition context module 211 may determine that the insertion location is within a field of the type "UPPERCHAR," and thus should only receive data in capitalized characters. The recognition context module 211 would then generate heuristics requiring the recognition module 213 to capitalize recognized text being inserted into this field.

Moreover, the recognition context module 211 can generate heuristics instructing the recognition module 213 to provide punctuation for recognized text. For example, if the recognition context module 211 determines that the insertion location is within a field of the type "TELEPHONE" and thus should receive only data corresponding to telephone numbers, then the recognition context module 211 can generate heuristics instructing the recognition module 213 to provide dashes between groups of recognized text. For example, the recognition context module 211 could generate heuristics instructing the recognition module 213 to insert dashes after the third and sixth numbers in recognized text for this field. Thus, if the user handwrote 1234567890, the recognition module would insert dashes to generate the text 123-456-7890.

Additionally, the recognition context module 211 may prevent the recognition module 213 from replacing existing text with identical recognized text. For example, a user may be correcting text that already exists in the target application 207. In this situation, the user will not want the recognition module 213 to generate recognized text identical to the existing text that the user intends to correct. By identifying the existing text through the text services framework module 205, the recognition context module 211 can provide instructions to the recognition module 213 that will prevent the recognition module 213 from replacing existing text with identical recognized text.

Referring now to the recognition module 213, the recognition module 213 generates text from natural input objects. More particularly, the recognition module 213 identifies one or more text candidates corresponding to a natural input object from a natural input recognition dictionary. For example, if the natural input object is a handwriting input, the recognition module 213 will identify text candidates in a handwriting recognition dictionary that have handwriting stroke characteristics matching the handwriting input. Similarly, if the natural input object is a speech input, the recognition module 213 will identify text candidates in a voice recognition dictionary that have phonemes matching the speech input. The recognition module 213 will then select or recognize the text candidate most closely corresponding to the natural input object. It should be noted that a handwriting recognition dictionary and a voice recognition may optionally be combined into a single recognition dictionary.

For example, if the natural input object is the handwritten word "text," the recognition module 213 may identify a list of words in the recognition dictionary that correspond to the shape of the handwritten letters, such as the words "test," "tat," "best," "tux, " tent," and "tot." The recognition module 213 then assigns a ranking to each of these text candidates based upon its correspondence to the natural input, and selects the highest-ranked text candidate to be the text recognized from the natural input. Thus, the recognition module 213 does not typically identify only a single word corresponding to a natural input object, but instead identifies a list of alternate text candidates in addition to the selected text candidate recognized from the natural input.

As discussed above, the recognition module 213 may format the selected text candidate to provide spacing, capitalization, punctuation or other formatting. As previously noted, the recognition module 213 may select a text candidate or format a recognized text candidates according to heuristics generated by the recognition context module 211. Once the recognition module 213 has generated recognized text from an actual input object, it then forwards the generated text to the target application 207 through the text services framework module 205. The recognition module 213 also forwards the generated text to the object model module 215, along with the original natural input object and the text candidates matching the original natural input object.

Referring now to the object model module 215, the object model module 215 collects the text generated by the recognition module 213, and the original natural input object from which the text was recognized. For example, if the original natural input object was handwriting input, then the object model module 215 may store the various characteristics of the strokes making up the handwriting input. In addition, the object model module 215 collects the non-selected text candidates identified by the recognition module 213 as matching the original natural input object. By collecting this information for each natural input object recognized by the recognition module 213 for insertion into the target application 207, the object model module 215 creates an object model describing the history of the text recognition for the target application 207.

The object model created by the object model module 215 can advantageously be used to improve the user's recognition experience by allowing for easier correction of inaccurately recognized natural input. For example, if the recognition module 213 cannot clearly distinguish between two or more text candidates for a sequence of natural input objects, the object model can be used to create a lattice of the alternate text candidates. The lattice may be arranged using, for example, a natural language model or other known technique for correlating text. If the user then subsequently corrects inaccurately recognized text by selecting one of the alternate text candidates in the lattice, the relational connections defined by the lattice can be used to correct other inaccurately recognized text. Moreover, if a handwriting input object does not correspond to text, but is instead a drawing, then the lattice formed with the object model can be used to accurately recognize related handwriting input as drawings. For example, a language model might identify a drawing by searching for handwriting input objects whose text candidates do not correspond to a sentence that follows sentence-ending punctuation.

Also, the object model can be employed by the user to correct inaccurately recognized text. If the user selects multiple words for correction, the object model can be employed to provide the user with combinations of alternate text candidates corresponding to the selected words. For example, if the spoken words "hello world" are incorrectly recognized as "halo walled," then the object model can be employed to provide the user with combinations of the top alternate text candidates for each inaccurately recognized word. Thus, the user might be presented with the eight combinations "halo world," "halo whirled," "hello walled," "hello world," "hello whirled," "yellow walled," "yellow world," and "yellow world." The user could then select the correct combination of alternate text candidates.

With some embodiments of the invention, the object model module 215 provides the object model to the target application 207, such as by way of the text services framework module 205, for example. The object model can then be stored by the text services framework module interface 209 in the target application 207. This conveniently allows the target application 207 to employ its own natural language model, if available, to improve the correction of recognized text as described above. By storing the object model in the target application 207, the object model can be employed even after the target application 207 is no longer communicating with the natural input recognition module 203. Further, because the object model includes the original natural input object, a user can subsequently replace recognized text with the original input object from which it was recognized.

As previously mentioned, the natural input recognition module 203 also includes a correction module 217. The correction module 217 provides a correction interface through which a user can correct text, as will be discussed in detail below. Moreover, if the user employs the correction interface to submit a natural input object for replacing text that already exists in the target application 207, the correction module 217 will notify the recognition context module 211 of the existing text that is being replaced. As previously discussed, the recognition context module 211 can then generate heuristics that will prevent the recognition module 213 from generating text identical to the existing text being replaced.

Operation of the Recognition Tool

Figure 3A:
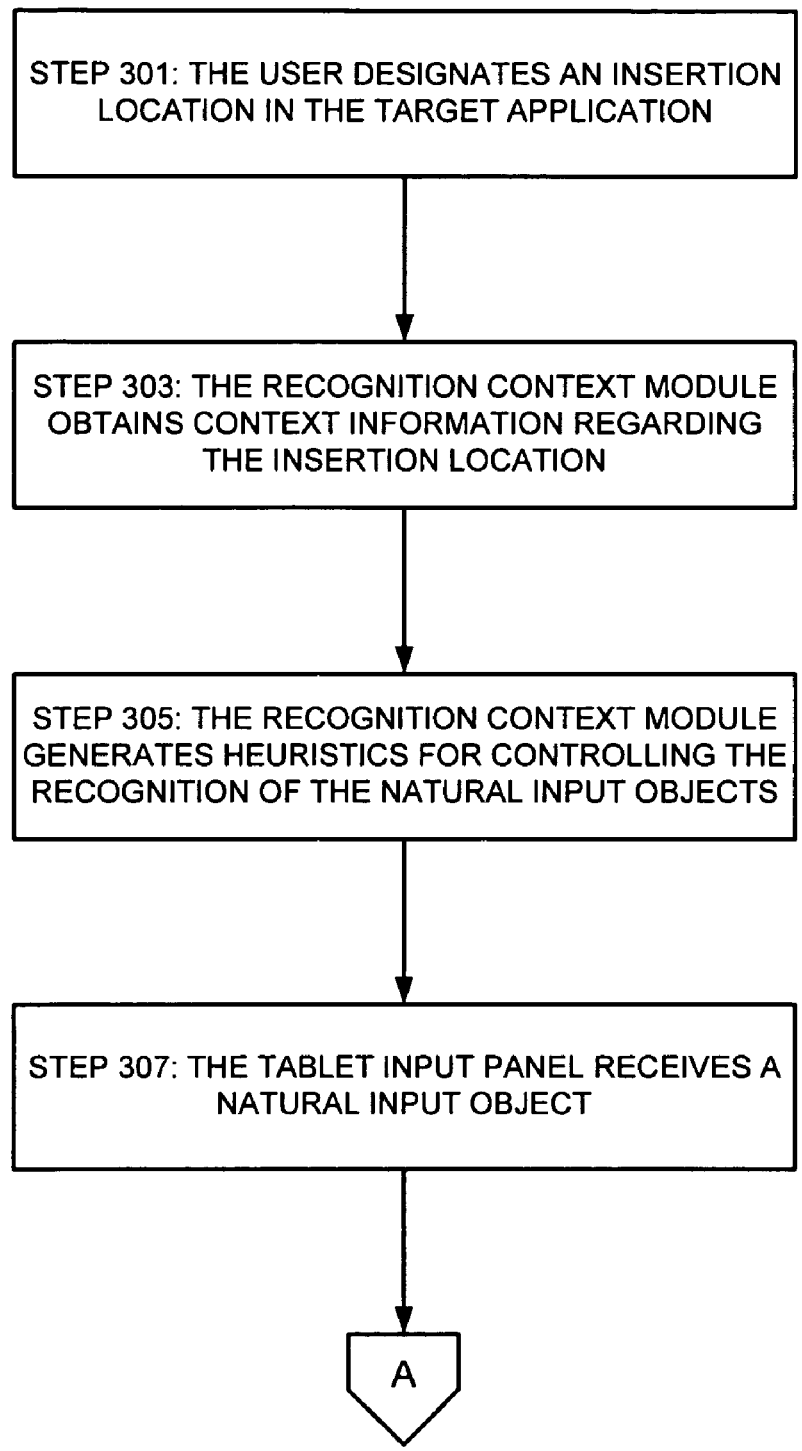
FIGS. 3A and 3B illustrate flowcharts showing a method of operation for the recognition tool according to an embodiment of the invention.
Figure 3B:
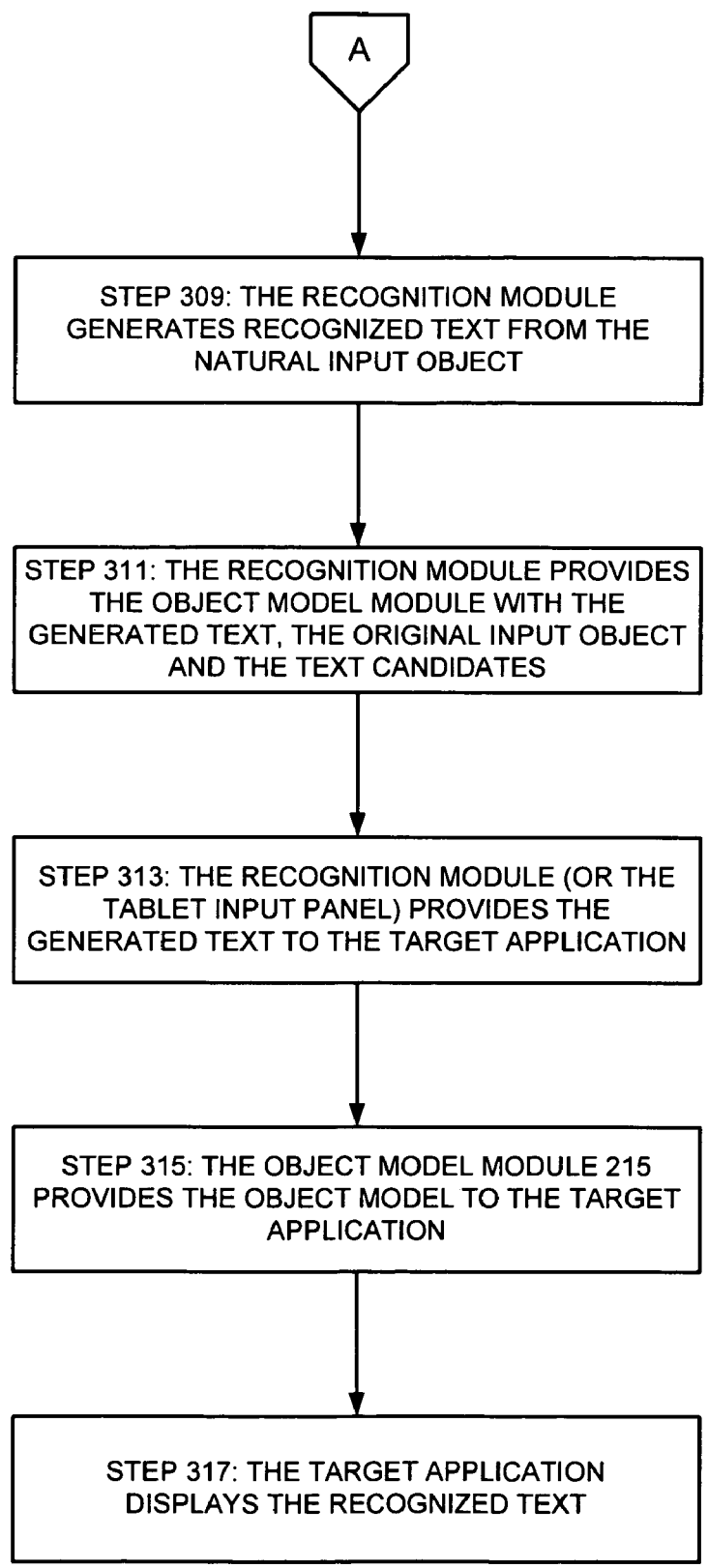

The operation of the natural input recognition module 203 will now be described with reference to the flowcharts shown in FIGS. 3A and 3B. First, in step 301, the user designates an insertion location in the target application 207. As will be appreciated by those of ordinary skill in the art, the insertion location may be a single insertion point, or it may be a selection of existing text. Next, in step 303, the recognition context module 211 obtains context information regarding the insertion location through the text services framework module 205. The recognition context module 211 then generates heuristics for controlling the recognition of the natural input objects in step 305. Next, in step 307, the tablet input panel 201 receives a natural input object, which it forwards to the recognition module 213.

In step 309, the recognition module 213 generates recognized text from the natural input object based upon the heuristics provided by the recognition context module 211. As previously noted, the recognition module 213 may format the recognized text according to the provided heuristics. In step 311, the recognition module 213 provides the generated text to the object model module 215, along with the original input object and the text candidates identified by the recognition module 213 as matching the original input object. Then, in step 313, the recognition module 213 (or, with some embodiments of the invention, the tablet input panel 201) provides the generated text to the target application 207 by way of the text services framework module 205. Also, in step 315, the object model module 215 provides the object model to the target application 207 through the text services framework module 205. It will be appreciated by those of ordinary skill in the art, however, that the recognition module 213 can provide the information contained in the object model directly to the text services framework module 205. Lastly, in step 317, the target application 207 displays the recognized text received from the recognition module 213.

The Correction User Interface

Figure 4:
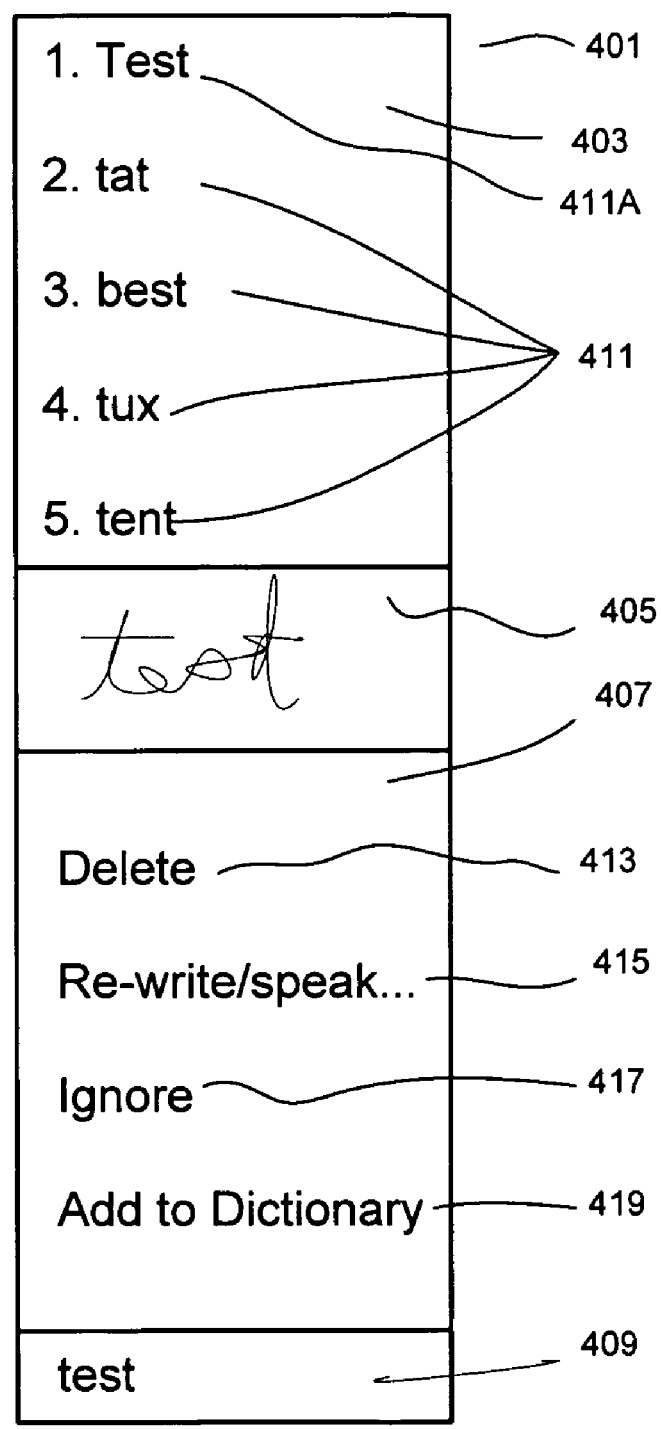
FIG. 4 illustrates one embodiment of a correction interface that the recognition tool of the invention may provide for correcting inaccurately recognized text.

As previously noted, the correction module 217 may provide a user interface for correcting text in the target application 207. FIG. 4 illustrates such a correction interface 401 according to one embodiment of the invention. As seen in this figure, the correction interface 401 includes an alternate list area 403, and an original input object area 405. The correction interface 401 also includes a command menu area 407 and a selected text area 409.

If the text being corrected was inaccurately recognized from a natural input object, then the alternate list area 403 will include alternate text choices 411 that also correspond to the natural input object. More particularly, as explained in detail above, when recognizing text corresponding to a natural input object, the recognition module 213 may additionally determine a list of one or more alternate text choices that also correspond to the natural input object. Thus, the alternate list area 403 displays the alternate text choices 411 that were the next highest-ranked by the recognition module 213 below the selected text. If the user determines that an alternate text choice 411 accurately corresponds to the natural input object, the user may select that correct alternate text choice 411. In response to the user selecting one of the alternate text choices 411 displayed in the alternate list area 403, the correction module 217 replaces the existing text with the selected alternate text choice 411.

As illustrated in FIG. 4, the alternate list area 403 displays only five alternate text choices 411, regardless of the total number of alternate text choices identified by the recognition module 213 as possibly corresponding with the natural input object. By limiting the number of displayed alternate text choices 411 to a small value, such as a value in the range of 5 to 9, the correction interface 401 significantly reduces the amount of reading time required by the user to identify the accurate alternate text choice 411. At the same time, by providing more than just one or two alternate text choices 411, the correction interface 401 substantially increases the probability that the accurate alternate text choice 411 will be displayed in the alternate list area 403.

It should also be noted that the initial alternate text choice 411 displayed in the alternate list area 403 may always be the reverse capitalization of the existing text. With handwriting, a handwriting recognition process may have difficulty distinguishing the lower-case form of a letter from its upper-case form. Similarly, a voice recognition process usually will be unable to distinguish between text that should begin with an upper case letter and text that should begin with a lower-case letter. Thus, by providing the reverse capitalization of the existing text as the first alternate text choice 411 displayed in the alternate list area 403, the correction interface 401 allows a user to very quickly correct this common type of recognition error.

With some embodiments of the invention, the alternate text choices 411 may be displayed in the alternate list area 403 based upon the confidence that the recognition module 211 has in their accuracy. For example, alternate text choices 411 for which the recognition module 211 has a high level of confidence can be displayed in green, while alternate text choices for which the recognition module 211 has a low-level of confidence can be displayed in red. Of course, the alternate list area 403 can display the alternate text choices 411 according to a variety of different confidence levels. Techniques for determining such confidence levels are disclosed in the copending U.S. patent application Ser. No. 10/120,153, filed Apr. 9, 2002, entitled "Assignment And Use Of Confidence Levels For Recognized Text," naming Manish Goyal et al. as inventors, which application is incorporated entirely herein by reference.

The original input object area 405 displays the original input object from which the inaccurate text was recognized. In the example shown in FIG. 4, the original input object was the handwritten word "text." This conveniently allows the user to review the original input object before correcting the inaccurate text. With some embodiments of the invention, the original input object area 405 may also serve as a command button for replacing the inaccurate text with the original input object. Thus, with these embodiments, activating the original input object area 405 would replace the inaccurate text shown in the target application 207 with the hand written word "test" as displayed and the original input object area 405. If the original input object was a voice input, then the original input object area 405 could be implemented as a button that, when activated, audibly played back the original voice input object.

The command menu area 407 displays various commands for editing the inaccurate text. For example, in the illustrated embodiment, the command menu area 407 includes the command "delete" 413, which the user may activate to delete the inaccurate text. The command menu area 407 also includes the command "re-write/speak" 415. When the user activates this command 413, the correction module 217 summons the tablet input panel 201, and transfers focus from the command menu area 407 to the user interface provided by the tablet input panel 201. The user can then subsequently write or speak the desired text employing the tablet input panel 201, and the recognition module 213 will recognize the text to replace the inaccurate text. As previously noted, however, when the user activates the command re-write/speak 415, to submit natural input to replace the inaccurate text, the recognition context module 211 will ensure that the recognition module 213 does not select a text candidate identical to the inaccurate text.

The command menu area 407 further includes the command "ignore" 417. This command may be used when, for example, the target application 207 has indicated that the inaccurate text is misspelled or grammatically incorrect, and the user disagrees with the application's assessment. In addition, the command menu area 407 includes the command "add to dictionary" 419. Again, this command may be used when the designated text is not actually inaccurate, but the target application 207 has indicated that the existing text is misspelled, and the user disagrees with the application's assessment. This command adds the existing text to the recognition dictionary employed by the recognition module 211. It should be noted that, where the recognition module 211 supports both voice and handwriting recognition, activating the command 219 may add the existing text to both the recognition dictionary for the voice recognition process and the recognition dictionary for these handwriting recognition process. Alternately, the command 419 may add the existing text to a recognition dictionary shared between the voice recognition process and the handwriting recognition process.

Figure 5:
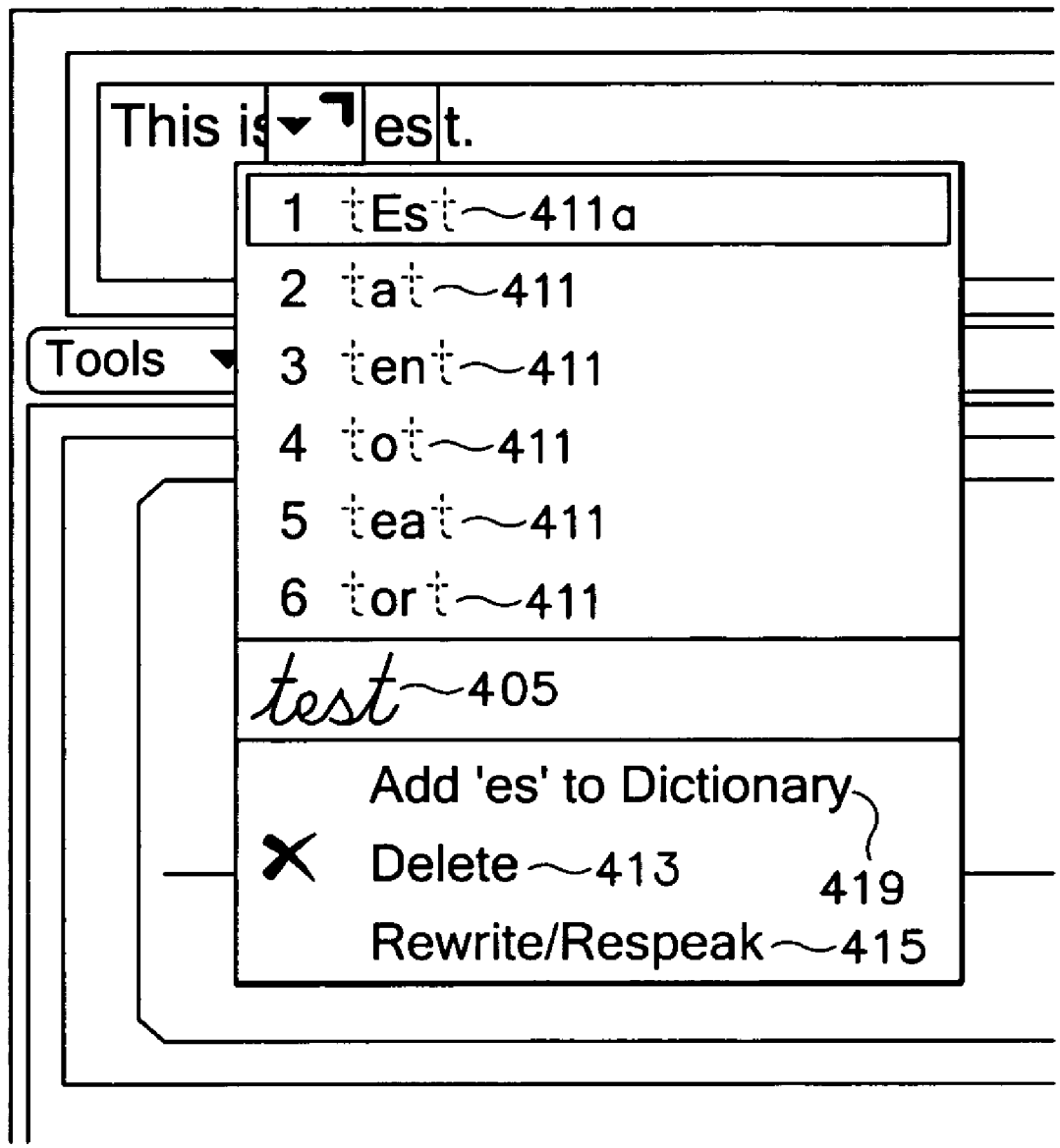
FIG. 5 illustrates another embodiment of a correction interface that the recognition tool of the invention may provide for correcting inaccurately recognized text.

As seen in FIG. 4, the selected text area 409 displays the inaccurate (or otherwise designated) text. The user may conveniently employ the selected text area 409 to search for and display an accurate alternate text choice 411 in the alternate list area 403. More particularly, the user may select one or more characters of the text displayed in the selected text area 409. Alternately, as shown in FIG. 5, the user may select only a portion of the existing text displayed in the target application 207. In response to the selection, the recognition module 213 will provide only those text candidates it identified that correspond to the selected text. Thus, the recognition module 213 may identify only text candidates that differ by the selected characters. For example as shown in FIG. 5, when the characters "es" are selected, the recognition module 211 only provides the correction module 217 with the alternates "tat," tent," "tot," "teat," and "tort." The correction interface 401 thus omits the alternates "best" and "tux" shown in FIG. 4." Thus, the selected text area 409 provides the user with a powerful tool for allowing the recognition module 213 to quickly eliminate alternate text choices 411 that contained inaccurately recognized characters.

Use of the Recognition Tool Without the Text Services Framework Module

Figure 6:
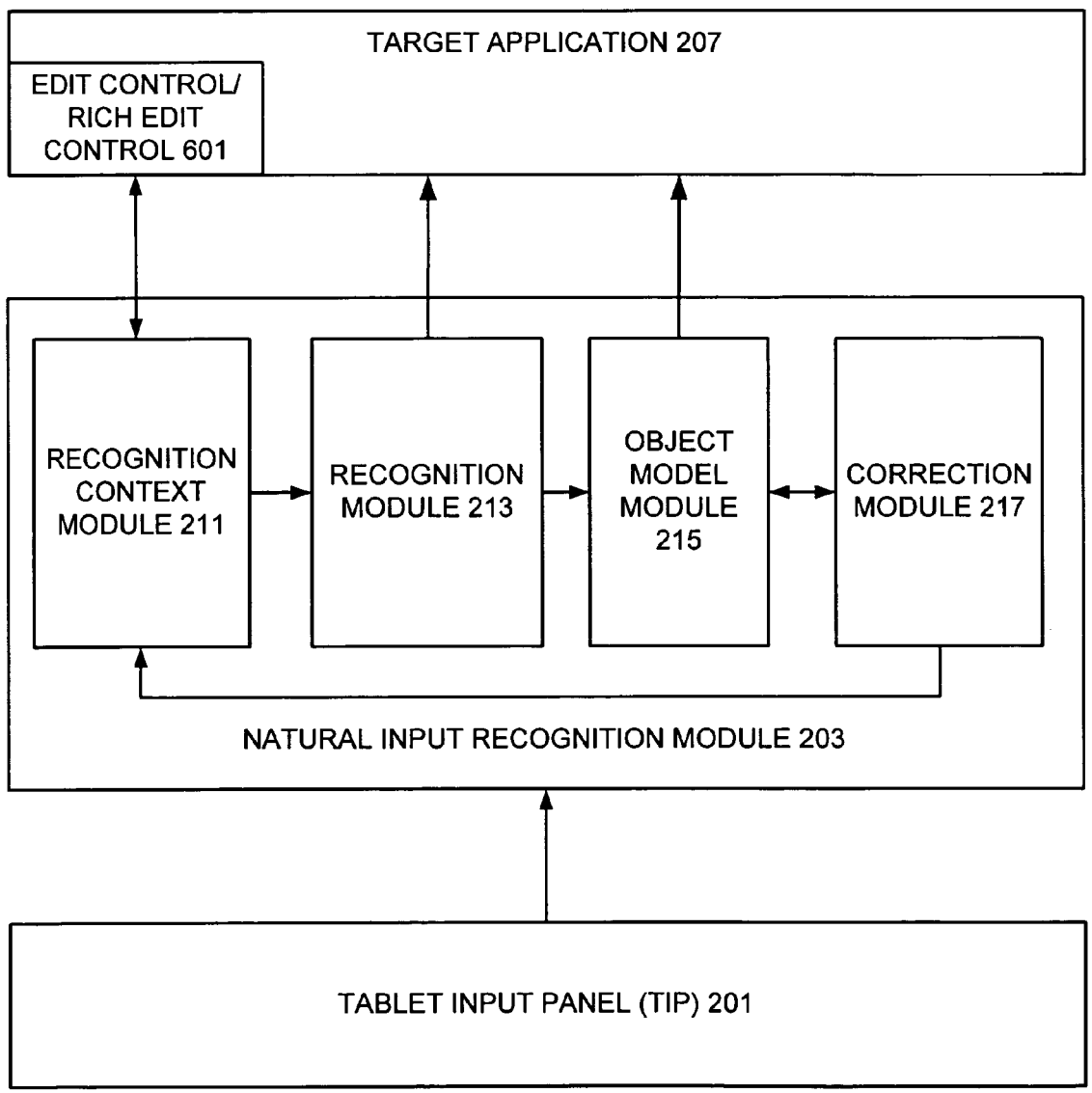
FIG. 6 illustrates components of a recognition tool according to an embodiment of the invention.

In the above-described embodiments of the invention, the recognition context module 211 obtains context information from the target application 207 through the text services framework module 205. As will be appreciated by those of ordinary skill in the art, however, not all applications will support the use of the text services framework module 205. With these target applications 207, the recognition context module 211 can instead obtain context information regarding the target application 207 from its edit control/or rich edit control objects 601 or other data structures, as previously noted. An illustration of this configuration, omitting the text services framework module 205, is shown in FIG. 6. As known in the art, an edit control is a rectangular control window typically used in a dialog box to permit the user to enter and edit text. Similarly, a rich edit control is a window in which the user can enter, edit, format, print, and save text, which can be assigned character and paragraph formatting, and which can include embedded COM objects. The characteristics of edit controls and rich edit controls in the target application 207 will typically be stored in tables that can be accessed by the recognition context module 211.

For example, if the user is attempting to insert recognized text into the address field of the Microsoft Internet Explorer 5 browser application, the recognition context module 211 will determine that the software application does not support the use of the text services framework module 205. In response, the recognition context module 211 can look up the characteristics of this field in the appropriate table of the browser application, and thereby determine that this control is a universal resource locator (URL) address bar.

The recognition context module 211 will then generate heuristics for the recognition module 213 requiring that generated text being inserted into this field have no spaces.

CONCLUSION

Although the invention has been defined using the appended claims, these claims are exemplary in that the invention may include the elements and steps described herein in any combination or sub combination. Accordingly, there are any number of alternative combinations for defining the invention, which incorporate one or more elements from the specification, including the description, claims, and drawings, in various combinations or sub combinations. For example, while the natural input recognition module of the invention is shown as a distinct entity, one more components of this module may be incorporated and the tablet input panel 201. Also, while the recognized text is described above as being corrected in the target application 207, if the tablet input panel 201 provides a stage for displaying recognized text before it is delivered to the target application 207, then the recognized text may be corrected at the stage rather than in the target application 207 as described above.

It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A method of generating text from a natural input object for insertion into a target application, comprising:
   receiving a natural input object from which a recognized text is to be recognized;
   recognizing the recognized text from the natural input object;
   obtaining from the target application a context for insertion of recognized text recognized from the natural input object into an insertion location of the target application, wherein the context depends upon a length of the insertion location;
   assigning a category to a field in the target application into which the recognized text will be inserted, wherein the field includes the insertion location;
   formatting the recognized text by providing spacing for the recognized text according to the category for the field in the target application into which the recognized text will be inserted; and
   generating recognized text from the natural input object based upon the obtained context.

2. The method of generating text recited in claim 1, further including:
   determining if context information is provided for the field in the target application into which the recognized text will be inserted; and
   if context information is not provided for the field in the target application into which the recognized text will be inserted, then categorizing the field into a first category.

3. The method of generating text recited in claim 2, further including
   determining if the context information allows for control of insertion of text into the field in the target application into which the recognized text will be inserted; and
   if the context information allows for control of insertion of text into the field in the target application into which the recognized text will be inserted, then categorizing the field into a second category.

4. The method of generating text recited in claim 1, further including:
   providing spacing for the recognized text based upon a language of the recognized text.

5. The method of generating text recited in claim 1, further comprising:
   determining if text before the insertion location forms a word when concatenated with the recognized text; and
   if text before the insertion location forms a word when concatenated with the recognized text, omitting a space before the recognized text.

6. The method of generating text recited in claim 1, further comprising:
   determining if text after the insertion location forms a word when concatenated with the recognized text; and if text after the insertion location forms a word when concatenated with the recognized text, omitting a space after the recognized text.

7. The method of generating text recited in claim 1, wherein formatting the recognized text includes determining capitalization for the recognized text.

8. The method of generating text recited in claim 7, wherein formatting the recognized text includes capitalizing every character in the recognized text.

9. The method of generating text recited in claim 7, wherein formatting the recognized text includes retaining a capitalization case, recognized from the natural input object case, in the recognized text.

10. The method of generating text recited in claim 1, wherein formatting the recognized text includes determining punctuation for the recognized text.

11. The method of generating text recited in claim 10, wherein formatting the recognized text includes adding punctuation to the recognized text.

12. The method of generating text recited in claim 1, wherein generating recognized text from the natural input object includes:
    determining if the recognized text is replacing text existing in the target application; and
    if the recognized text is replacing text existing in the target application, recognizing the recognized text from the natural input object to be different from the existing text being replaced.

13. The method of generating text recited in claim 1, wherein the context is obtained from a correction process for correcting existing text.

14. The method of generating text recited in claim 13, further comprising:
    determining if the recognized text is replacing existing text; and
    if The recognized text is replacing text existing in the target application, recognizing the recognized text from the natural input object to be different from the existing text being replaced.

15. A computer-readable storage medium storing computer-executable instructions for implementing a recognition tool for recognizing text from a natural input object, the computer-executable instructions comprising:
    a recognition context module that, when executed by a computer, determines a context of an insertion location into which a recognized text will be inserted wherein the context depends upon a length of the insertion location; and
    a recognition module that, when executed by the computer:
       recognizes the recognized text from the natural input object;
       assigns a category to a field in a target application into which the recognized text will be inserted, wherein the field includes the insertion location;
       formats the recognized text b providing spacing for the recognized text according to the category for the field in the target application into which the recognized text will be inserted;
       identifies one or more text candidates corresponding to the natural input object;
       selects one of the one or more text candidates that most closely corresponds to the natural input object, and
       generates and displays text from the selected text candidate based upon the context determined by the recognition context module.

16. The computer-readable storage medium recited in claim 15,
wherein when executed by the computer, the recognition module selects the one of the one or more text candidates based upon the context determined by the recognition context module.

17. The computer-readable storage medium recited in claim 16, wherein when executed by the computer, the recognition module formats the selected text candidate based upon the context determined by the recognition context module.

18. The computer-readable storage medium recited in claim 15, wherein when executed by the computer, the recognition module formats the selected text candidate based upon the context determined by the recognition context module.

19. The computer-readable storage medium recited in claim 18, wherein when executed by the computer, the recognition module provides spacing for the selected text candidate based upon the context determined by the recognition context module.

20. The computer-readable storage medium recited in claim 18, wherein when executed by the computer, the recognition module determines capitalization for the selected text candidate based upon the context determined by the recognition context module.

21. The computer-readable storage medium recited in claim 18, wherein when executed by the computer, the recognition module determines punctuation for the selected text candidate based upon the context determined by the recognition context module.

22. The computer-readable storage medium recited in claim 15, wherein the computer-executable instructions further comprise:
an object model module that, for each of a plurality of selected text candidates, stores the natural input object for which the selected text candidate was selected, and farther stores the one
or more text candidates corresponding to the natural input object for which the selected text candidate was selected.

23. The computer-readable storage medium recited in claim 15, wherein the computer-executable instructions further comprise:
a correction module that, when executed by the computer, provides a user interface for correcting text generated by the correction module.

24. The computer-readable storage medium recited in claim 23, wherein when executed by the computer:
if the correction module receives a natural input object to replace existing text, the correction module notifies the recognition context module of the existing text that is being replaced; and
the recognition context module prevents the recognition module from generating text identical to the existing text that is being replaced.

* * * * *